(12) United States Patent
Ideue et al.

(10) Patent No.: US 11,548,366 B2
(45) Date of Patent: Jan. 10, 2023

(54) VEHICLE DRIVE APPARATUS

(71) Applicants: AISIN CORPORATION, Aichi (JP); TOYOTA JIDOSHA KABUSHIKI KAISHA, Toyota (JP)

(72) Inventors: Shigeki Ideue, Kariya (JP); Takeru Morita, Kariya (JP); Keita Inda, Kariya (JP); Kenji Dozono, Kariya (JP); Tatsuya Okishima, Kariya (JP); Toshihiko Kamiya, Toyota (JP); Masashi Ikemura, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/417,509

(22) PCT Filed: Jan. 8, 2020

(86) PCT No.: PCT/JP2020/000242
§ 371 (c)(1),
(2) Date: Jun. 23, 2021

(87) PCT Pub. No.: WO2020/145283
PCT Pub. Date: Jul. 16, 2020

(65) Prior Publication Data
US 2022/0111720 A1    Apr. 14, 2022

(30) Foreign Application Priority Data
Jan. 9, 2019 (JP) .............................. JP2019-001798

(51) Int. Cl.
*B60K 6/40* (2007.10)
*B60K 6/387* (2007.10)
(Continued)

(52) U.S. Cl.
CPC .................. *B60K 6/40* (2013.01); *B60K 6/38* (2013.01); *B60K 6/387* (2013.01); *B60K 6/405* (2013.01);
(Continued)

(58) Field of Classification Search
CPC .......... B60K 6/405; B60K 6/387; B60K 6/48; B60K 2006/4825; F16D 13/683
See application file for complete search history.

(56) References Cited

U.S. PATENT DOCUMENTS

2012/0242198 A1  9/2012  Kasuya et al.
2013/0193816 A1  8/2013  Iwase et al.
(Continued)

FOREIGN PATENT DOCUMENTS

DE   11 2012 003 398 T5   4/2014
DE   10 2014 221 295 A1   4/2015
(Continued)

OTHER PUBLICATIONS

Apr. 7, 2020 International Search Report issued in International Patent Application No. PCT/JP2020/000242.
(Continued)

*Primary Examiner* — David J Hlavka
(74) *Attorney, Agent, or Firm* — Oliff PLC

(57) ABSTRACT

A vehicle drive apparatus includes: a first bearing disposed between a rotor support member and a case in a radial direction so as to restrict movement of the rotor support member to a first axial side relative to the case; and a second bearing disposed between a connecting shaft and the case in an axial direction so as to restrict movement of the connecting shaft to a second axial side relative to the case. A fluid transmission device is disposed on the first axial side relative to the connecting shaft. The rotor support member includes a tubular portion having a tubular shape extending in the
(Continued)

axial direction and fitted to an outer peripheral surface of the connecting shaft. Movement of the connecting shaft to the first axial side relative to the tubular portion is restricted.

14 Claims, 3 Drawing Sheets

(51) Int. Cl.
*B60K 6/48* (2007.10)
*F16H 57/021* (2012.01)
*F16H 57/04* (2010.01)
*B60K 6/38* (2007.10)
*B60K 6/405* (2007.10)
*F16D 25/0638* (2006.01)
*F16D 13/68* (2006.01)
*B60K 6/547* (2007.10)
*F16H 57/02* (2012.01)

(52) U.S. Cl.
CPC .............. *B60K 6/48* (2013.01); *F16D 13/683* (2013.01); *F16D 25/0638* (2013.01); *F16H 57/021* (2013.01); *F16H 57/043* (2013.01); *F16H 57/0424* (2013.01); *F16H 57/0471* (2013.01); *F16H 57/0472* (2013.01); *B60K 6/547* (2013.01); *B60K 2006/4825* (2013.01); *F16H 2057/02034* (2013.01); *F16H 2057/02043* (2013.01)

(56) References Cited

U.S. PATENT DOCUMENTS

2014/0231174 A1* 8/2014 Iwase .................... F16H 57/045
 184/6.12
2015/0000262 A1* 1/2015 Iwase .................... F16H 57/021
 60/330
2017/0080793 A1* 3/2017 Suyama ............... F16H 57/042

FOREIGN PATENT DOCUMENTS

| | | |
|---|---|---|
| JP | 2012-183879 A | 9/2012 |
| JP | 2012-200074 A | 10/2012 |
| JP | 2013-96552 A | 5/2013 |
| JP | 2017-177884 A | 10/2017 |
| WO | 2017/170396 A1 | 10/2017 |

OTHER PUBLICATIONS

Dec. 10, 2021 Extended European Search Report issued in Patent Application No. 20739154.1.

\* cited by examiner

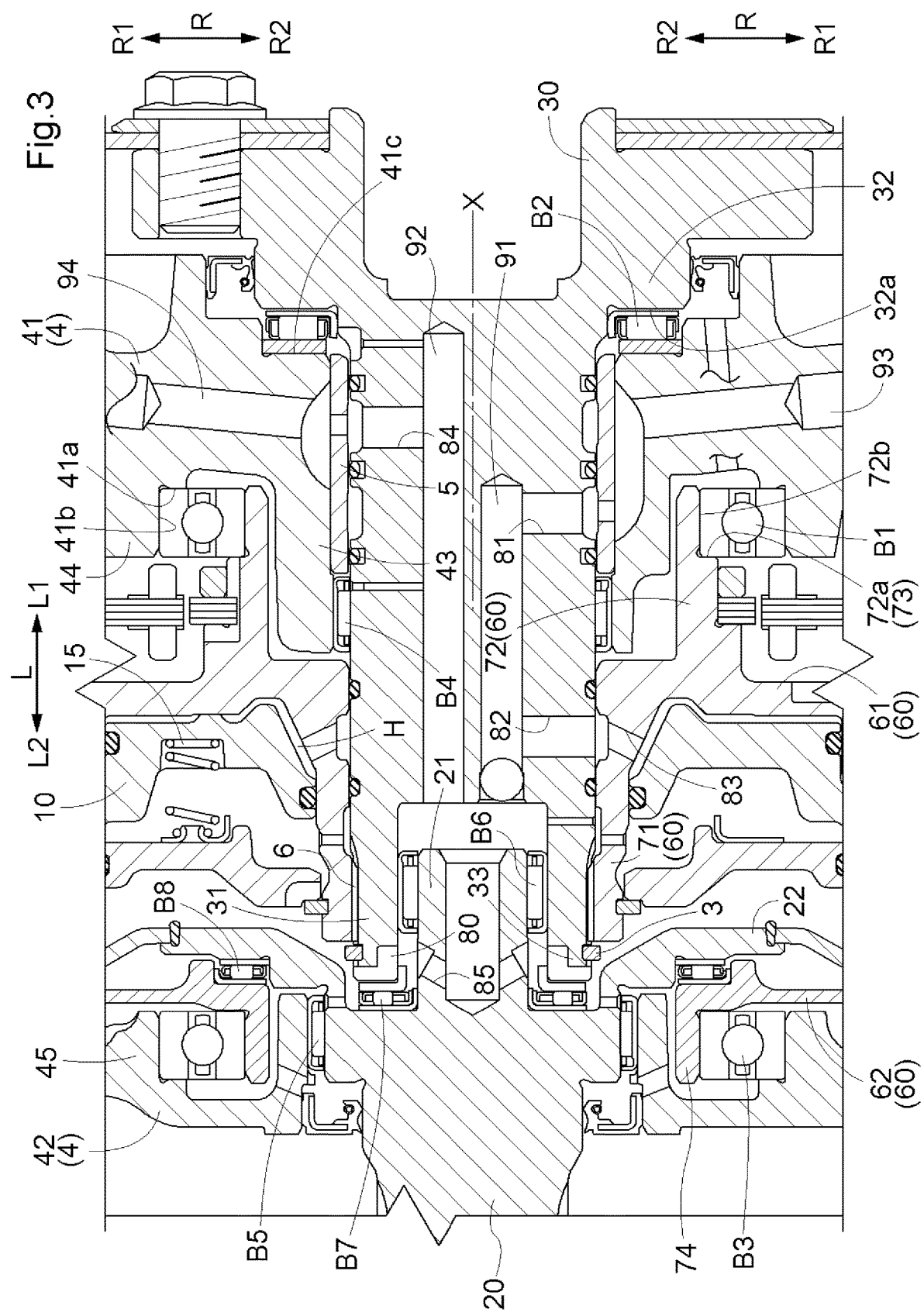

VEHICLE DRIVE APPARATUS

TECHNICAL FIELD

The present disclosure relates to vehicle drive apparatuses each including: a rotary electric machine serving as a driving force source for a wheel; a rotor support member supporting a rotor of the rotary electric machine; a connecting shaft connected to the rotor support member; a fluid transmission device connected to the rotor support member through the connecting shaft; and a case.

BACKGROUND ART

An example of such vehicle drive apparatuses is disclosed in Japanese Unexamined Patent Application Publication No. 2017-177884 (JP 2017-177884 A), which will be referred to as "Patent Document 1". The reference signs within parentheses in the following description of BACKGROUND ART correspond to those used in Patent Document 1. A vehicle drive apparatus disclosed in Patent Document 1 includes a connecting member (9) for connecting a rotary electric machine (MG) to a torque converter (TC). A rotor support member (22) supporting a rotor body (Ro) of the rotary electric machine (MG) is connected to the connecting member (9). The connecting member (9) is disposed such that its movement to both sides in an axial direction (L) relative to a tubular support (61) secured to a case (3) is restricted.

Specifically, as illustrated in FIG. 3 of Patent Document 1, the connecting member (9) includes two members, i.e., a first connecting member (91) and a second connecting member (92). A first bearing (71) for restricting movement of the first connecting member (91) to a second axial side (L2) is disposed between the tubular support (61) and the first connecting member (91) in the axial direction (L). A second bearing (72) for restricting movement of the second connecting member (92) to a first axial side (L1) is disposed between the tubular support (61) and the second connecting member (92) in the axial direction (L). The first connecting member (91) and the second connecting member (92) are connected to each other with a bolt so as to restrict relative movement of the first connecting member (91) and the second connecting member (92) in the axial direction (L). Thus, movement of the connecting member (9) to both sides in the axial direction (L) relative to the tubular support (61) is restricted by the two bearings, i.e., the first bearing (71) and the second bearing (72). A load may be exerted on the connecting member (9) in the axial direction (L) owing to, for example, ballooning of the torque converter (TC) described in paragraph 0061 of Patent Document 1.

RELATED ART DOCUMENTS

Patent Documents

Patent Document 1: JP 2017-177884 A

SUMMARY OF THE DISCLOSURE

Problem to be Solved by the Disclosure

As described above, the vehicle drive apparatus disclosed in Patent Document 1 is provided with a bearing for restricting movement of a connecting shaft (which is a connecting member in Patent Document 1) to one side in an axial direction and a bearing for restricting movement of the connecting shaft to the other side in the axial direction so as to restrict movement of the connecting shaft to both sides in the axial direction. The vehicle drive apparatus disclosed in Patent Document 1 thus requires two dedicated bearings in order to restrict movement of the connecting shaft to both sides in the axial direction. To cut down the cost of the vehicle drive apparatus, it is desirable to be able to reduce the number of components required for a structure for restricting movement of the connecting shaft to both sides in the axial direction.

Accordingly, what is desired is to provide a technique that enables a vehicle drive apparatus, which includes a fluid transmission device connected to a rotor support member through a connecting shaft connected to the rotor support member, to restrict movement of the connecting shaft to both sides in an axial direction with a smaller number of components.

Means for Solving the Problem

A vehicle drive apparatus according to the present disclosure includes: a rotary electric machine serving as a driving force source for a wheel; a rotor support member supporting a rotor of the rotary electric machine; a connecting shaft connected to the rotor support member; a fluid transmission device connected to the rotor support member through the connecting shaft; and a case housing the rotary electric machine, the rotor support member, the connecting shaft, and the fluid transmission device. One side in an axial direction is a first axial side, and the other side opposite to the first axial side in the axial direction is a second axial side. The vehicle drive apparatus further includes: a first bearing disposed between the rotor support member and the case in a radial direction so as to restrict movement of the rotor support member to the first axial side relative to the case; and a second bearing disposed between the connecting shaft and the case in the axial direction so as to restrict movement of the connecting shaft to the second axial side relative to the case. The fluid transmission device is disposed on the first axial side relative to the connecting shaft. The rotor support member includes a tubular portion having a tubular shape extending in the axial direction and fitted to an outer peripheral surface of the connecting shaft. Movement of the connecting shaft to the first axial side relative to the tubular portion is restricted.

In this structure, the fluid transmission device connected to the rotor support member through the connecting shaft is disposed on the first axial side relative to the connecting shaft, so that a relatively large load may be exerted on the connecting shaft to the second axial side owing to ballooning of the fluid transmission device. In this respect, the above structure involves disposing the second bearing between the connecting shaft and the case in the axial direction so as to restrict movement of the connecting shaft to the second axial side relative to the case. Accordingly, the load exerted on the connecting shaft to the second axial side is receivable by the case through the second bearing.

A load may also be exerted on the connecting shaft to the first axial side, although this load is extremely smaller than a load resulting from ballooning of the fluid transmission device. In this respect, the above structure involves restricting movement of the connecting shaft to the first axial side relative to the tubular portion of the rotor support member. The load exerted on the connecting shaft to the first axial side is thus transmitted to the rotor support member. In the above structure, the first bearing disposed between the rotor support member and the case in the radial direction restricts movement of the rotor support member to the first axial side relative to the case. Accordingly, a load transmitted from the connecting shaft to the rotor support member and exerted to the first axial side is receivable by the case through the first bearing. In other words, the above structure is able to restrict movement of the connecting shaft to the first axial side by using the first bearing. Because the load that may be exerted on the connecting shaft to the first axial side is relatively small, the use of the first bearing disposed between the rotor support member and the case in the radial direction makes it possible to suitably restrict movement of the connecting shaft to the first axial side without having to provide any dedicated bearing to restrict movement of the connecting shaft to the first axial side.

As described above, the above structure enables the case to receive, through the second bearing dedicated to restricting movement of the connecting shaft to the second axial side, a relatively large load that may be exerted on the connecting shaft to the second axial side, and enables the case to receive, through the first bearing disposed between the rotor support member and the case in the radial direction, a relatively small load that may be exerted on the connecting shaft to the first axial side without providing any dedicated bearing to restrict movement of the connecting shaft to the first axial side. Accordingly, the above structure is able to restrict movement of the connecting shaft to both sides in the axial direction with a smaller number of components than a structure that requires a dedicated bearing to restrict movement of the connecting shaft to the first axial side.

Further features and advantages of the vehicle drive apparatus will be apparent from the description of embodiments given below with reference to the drawings.

BRIEF DESCRIPTION OF THE DRAWINGS

FIG. 3 is a partially enlarged view of FIG. 2.

MODES FOR CARRYING OUT THE DISCLOSURE

Embodiments of vehicle drive apparatuses will be described with reference to the drawings. Unless otherwise specified, the terms "axial direction L", "radial direction R", and "circumferential direction" in the following description are defined with respect to an axis X (see FIG. 2) of a rotary electric machine MG. The axis X is the rotation axis of a rotor Ro of the rotary electric machine MG. The rotor Ro, a rotor support member 60 supporting the rotor Ro, and a connecting shaft 30 connected to the rotor support member 60 rotate around the axis X. One side in the axial direction L will be referred to as a "first axial side L1". The other side in the axial direction L (which is opposite to the first axial side L1 in the axial direction L) will be referred to as a "second axial side L2". An outer side in the radial direction R will be referred to as a "radially outer side R1". An inner side in the radial direction R will be referred to as a "radially inner side R2". Directions for components in the following description indicate directions for the components assembled to a vehicle drive apparatus 100. As used herein, terms related to, for example, the dimensions, arrangement directions, and arrangement locations of components conceptually include a state where there is a difference resulting from an error (e.g., an error allowable in the course of manufacture).

As used herein, the term "drivingly connected to" refers to a state where two rotary elements are connected to each other such that a driving force (which is synonymous with a torque) is transmittable therebetween, and encompasses a state where the two rotary elements are connected to each other such that the two rotary elements rotate together or a state where the two rotary elements are connected to each other through one or two or more transmission members such that a driving force is transmittable therebetween. Such transmission members include various members (e.g., a shaft, a gear mechanism, a belt, and a chain) that transmit rotation at equal or varying speeds. Such transmission members may include engagement devices (e.g., a friction engagement device and a meshing type engagement device) that transmit rotation and driving force selectively.

As used herein, the term "rotary electric machine" is used as a concept encompassing all of a motor (electric motor), a generator (power generator), and a motor generator that functions as both of a motor and a generator when necessary. When a virtual straight line parallel to the direction of a line of sight is moved in directions perpendicular to the virtual straight line, the term "overlapping as viewed in a particular direction" as used herein for the locations of two components refers to at least partial presence of a region where the virtual straight line intersects both of the two components.

Figure 1:
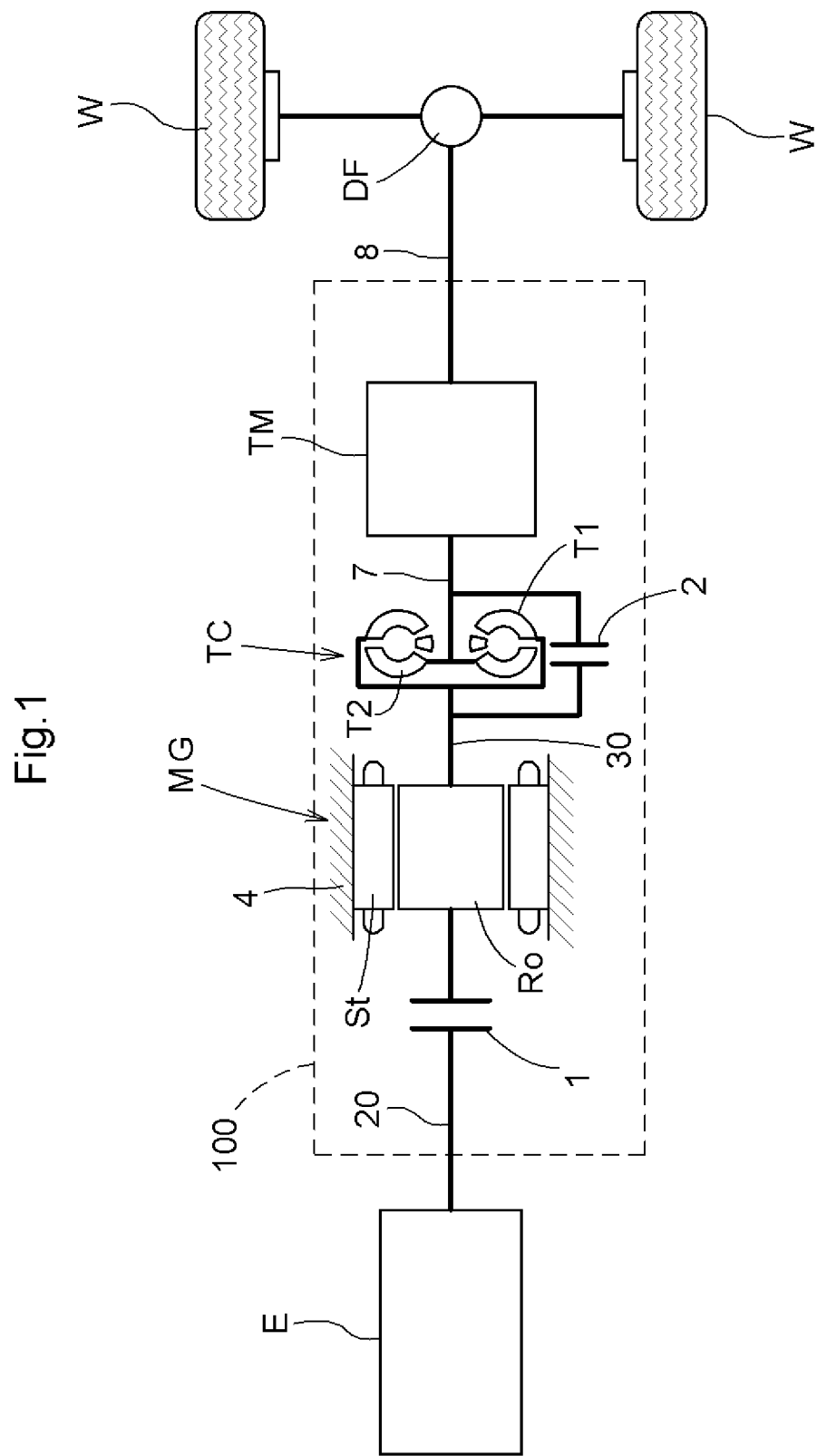
FIG. 1 is a diagram schematically illustrating a structure of a vehicle drive apparatus.
Figure 2:
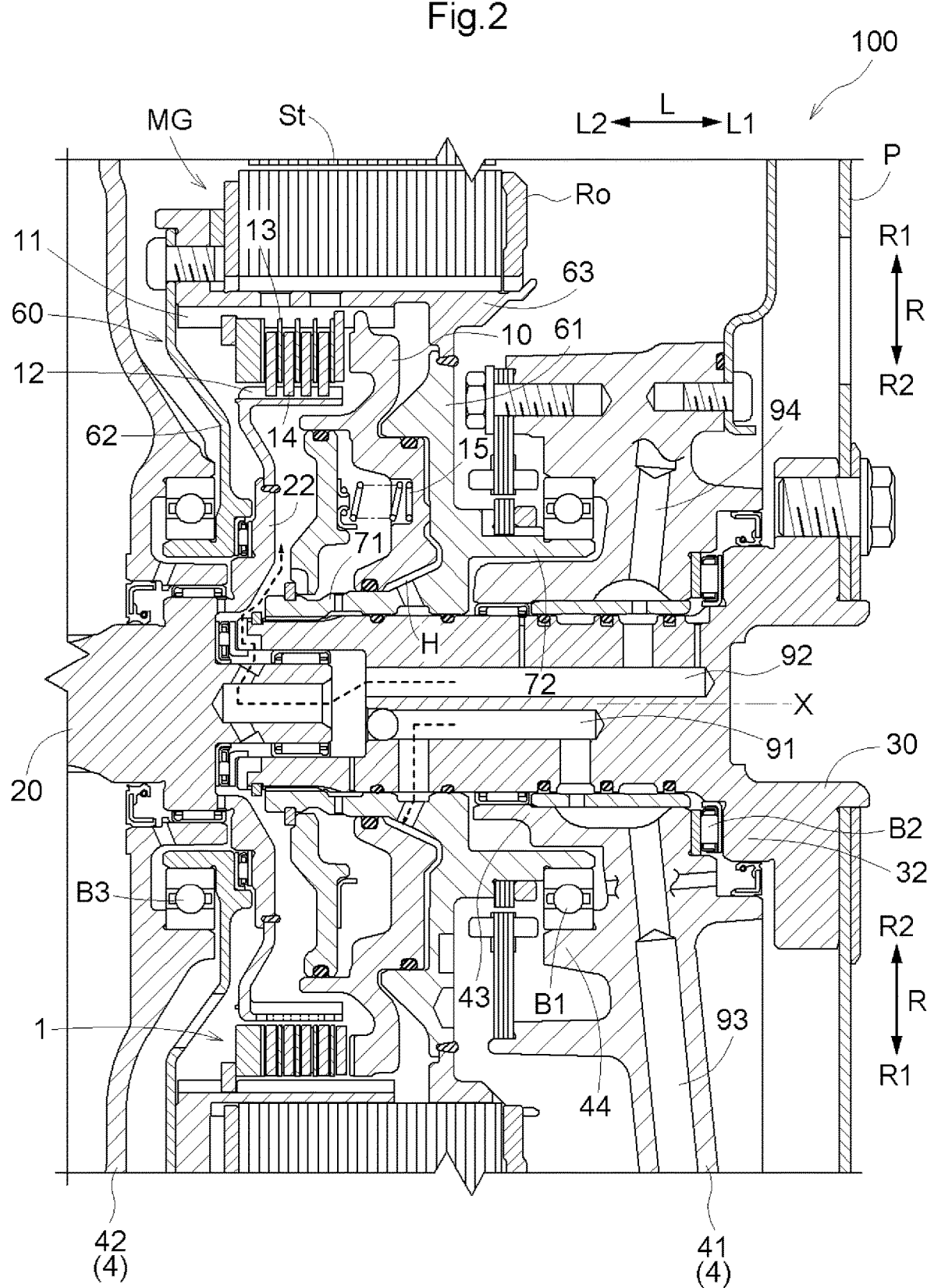
FIG. 2 is a cross-sectional view of a portion of the vehicle drive apparatus.

As illustrated in FIGS. 1 and 2, the vehicle drive apparatus 100 includes: the rotary electric machine MG serving as a driving force source for wheels W; the rotor support member 60 supporting the rotor Ro of the rotary electric machine MG; the connecting shaft 30 connected to the rotor support member 60; a torque converter TC connected to the rotor support member 60 through the connecting shaft 30; and a case 4 housing the rotary electric machine MG, the rotor support member 60, the connecting shaft 30, and the torque converter TC. The connecting shaft 30 functions as a rotor output shaft (rotary electric machine output shaft) to output rotation of the rotor Ro. The vehicle drive apparatus 100 transmits an output torque of the rotary electric machine MG to the wheels W through the connecting shaft 30 so as to cause a vehicle (i.e., a vehicle equipped with the vehicle drive apparatus 100) to travel. In the present embodiment, the vehicle drive apparatus 100 includes a differential gear device DF (output differential gear device) through which rotation and torque received from the rotary electric machine MG and/or component(s) adjacent thereto is distributed and transmitted to the two right and left wheels W. The vehicle drive apparatus 100 transmits the output torque of the rotary electric machine MG to the two right and left wheels W so as to cause the vehicle to travel. In the present embodiment, the torque converter TC is equivalent to a "fluid transmission device". The fluid transmission device is a device to transmit power through a fluid (which is oil in this embodiment). The torque converter TC is an example of the fluid transmission device. A fluid coupling having no torque amplifying function, for example, may be used as the fluid transmission device.

As illustrated in FIG. 1, the vehicle drive apparatus 100 in the present embodiment includes the torque converter TC and a transmission TM disposed in this order in a power transmission path, which connects the rotary electric machine MG to the wheels W, from a location adjacent to the rotary electric machine MG. The torque converter TC is disposed on the first axial side L1 relative to the rotary electric machine MG so as to be coaxial with the rotary electric machine MG. The transmission TM is disposed on the first axial side L1 relative to the torque converter TC so as to be coaxial with the torque converter TC (i.e., coaxial with the rotary electric machine MG). The torque converter TC is disposed on the first axial side L1 relative to the connecting shaft 30.

The torque converter TC includes a pump impeller T1 and a turbine runner T2. The torque converter TC further includes a second engagement device 2 through which the pump impeller T1 and the turbine runner T2 are directly connected to each other. The connecting shaft 30, which is connected to the rotor support member 60, is connected to the pump impeller T1 such that the connecting shaft 30 rotates together with the pump impeller T1. In this embodiment, the connecting shaft 30 is connected to the pump impeller T1 through a flexible plate P (see FIG. 2) such that the connecting shaft 30 rotates together with the pump impeller T1. The turbine runner T2 is connected to an intermediate member 7 such that the turbine runner T2 rotates together with the intermediate member 7.

The transmission TM is structured to be able to vary a speed ratio in steps or continuously. The transmission TM changes the rotation speed of an input member (transmission input member) of the transmission TM in accordance with a speed ratio at the present time so as to transmit the resulting rotation speed to an output member (transmission output member) of the transmission TM. In the present embodiment, the intermediate member 7 (which is connected to the turbine runner T2 such that the intermediate member 7 rotates together with the turbine runner T2) functions as the transmission input member, and an output member 8 drivingly connected to the wheels W functions as the transmission output member. In the present embodiment, the output member 8 is connected to the two right and left wheels W through the differential gear device DF. The transmission TM is, for example, a stepped automatic transmission that is able to switch shift speeds for which speed ratios are different.

As illustrated in FIG. 1, the vehicle drive apparatus 100 in the present embodiment further includes an input member 20 drivingly connected to an internal combustion engine E. The internal combustion engine E is a motor (e.g., a gasoline engine or a diesel engine) to be driven by fuel combustion inside the engine such that power is derived therefrom. The input member 20 is connected to an output member (e.g., a crankshaft) of the internal combustion engine E such that the input member 20 rotates together with the output member, or connected to the output member of the internal combustion engine E through a different member, such as a damper. As illustrated in FIG. 2, the input member 20 is disposed on the second axial side L2 relative to the connecting shaft 30 so as to be coaxial with the connecting shaft 30 (i.e., coaxial with the rotary electric machine MG).

The vehicle drive apparatus 100 is structured such that the rotary electric machine MG is connectable to the wheels W through a first power transmission path and the input member 20 is connectable to the wheels W through a second power transmission path. The vehicle drive apparatus 100 thus transmits the output torque(s) of one or both of the rotary electric machine MG and the internal combustion engine E to the wheels W so as to cause the vehicle to travel. In other words, the vehicle drive apparatus 100 according to the present embodiment is an apparatus for driving the vehicle (hybrid vehicle) including both of the internal combustion engine E and the rotary electric machine MG each serving as a driving force source for the wheels W. In the present embodiment, at least a portion of the first power transmission path and at least a portion of the second power transmission path are defined by a shared path. In this embodiment, the input member 20 is connected to the rotary electric machine MG through a first engagement device 1. With the first engagement device 1 in a directly engaged state, the input member 20 rotates together with the rotary electric machine MG. The first engagement device 1 is disposed in a power transmission path between the input member 20 and the rotary electric machine M so as to connect the input member 20 to the rotary electric machine MG selectively (which means that the input member 20 is connected to or disconnected from the rotary electric machine MG). The first engagement device 1 has the function of disconnecting the internal combustion engine E from the wheels W. In the present embodiment, the vehicle drive apparatus 100 thus includes the first engagement device 1 to connect and disconnect the input member 20 to and from the rotary electric machine MG. In the present embodiment, the first engagement device 1 is equivalent to a "friction engagement device".

As illustrated in FIGS. 1 and 2, the rotary electric machine MG includes: a stator St secured to the case 4; and a rotor Ro supported so as to be rotatable relative to the stator St. In the present embodiment, the rotary electric machine MG is an inner rotor type rotary electric machine. The rotor Ro is thus disposed at a location on the radially inner side R2 relative to the stator St where the rotor Ro overlaps with the stator St in a radial view along the radial direction R. As illustrated in FIG. 2, the first engagement device 1 in the present embodiment is disposed on the radially inner side R2 relative to the rotary electric machine MG so as to be coaxial with the rotary electric machine MG. In this embodiment, the first engagement device 1 is disposed at a location on the radially inner side R2 relative to the rotor Ro where the first engagement device 1 overlaps with the rotor Ro in the radial view. In the present embodiment, the vehicle drive apparatus 100 thus includes the first engagement device 1 disposed at a location on the radially inner side R2 relative to the rotor Ro where the first engagement device 1 overlaps with the rotor Ro in the radial view.

The first engagement device 1 is a friction engagement device. As illustrated in FIG. 2, the first engagement device 1 includes: a first support member 11 supporting first friction plates 13 from the radially outer side R1; a second support member 12 supporting second friction plates 14 from the radially inner side R2; and a piston 10 to press the first friction plates 13 and the second friction plates 14 in the axial direction L. The first support member 11 is a member supporting the first friction plates 13 and disposed on the radially outer side R1 relative to the first friction plates 13. The second support member 12 is a member supporting the second friction plates 14 and disposed on the radially inner side R2 relative to the second friction plates 14. Each first friction plate 13 is supported so as to be movable in the axial direction L, with its circumferential relative rotation with respect to the first support member 11 being restricted. Each second friction plate 14 is supported so as to be movable in the axial direction L, with its circumferential relative rotation with respect to the second support member 12 being restricted. In the present embodiment, the piston 10 is supported so as to be movable in the axial direction L, with its circumferential relative rotation with respect to the first support member 11 being restricted. The first friction plates 13 and the second friction plates 14 each have an annular plate shape. The first friction plates 13 and the second friction plates 14 are disposed coaxially (i.e., on the axis X) such that friction abutment surfaces thereof (i.e., end faces thereof facing in the axial direction L) are allowed to come into abutment with each other in the axial direction L.

In the present embodiment, the first support member 11 is connected to the rotor Ro of the rotary electric machine MG such that the first support member 11 rotates together with the rotor Ro. Specifically, as illustrated in FIG. 2, the first support member 11 is structured to rotate together with a rotor support 63 (which will be described below). In this embodiment, the first support member 11 is integral with the rotor support 63. The first support member 11 may be a member separate from the rotor support 63 and may be connected to (e.g., spline-connected to) the rotor support 63 such that the first support member 11 rotates together with the rotor support 63. In the present embodiment, the second support member 12 is connected to the input member 20 such that the second support member 12 rotates together with the input member 20. Specifically, the second support member 12 is connected to a flange (first flange 22) of the input member 20 through a radial extension formed to extend to the radially inner side R2 from the second support member 12. The input member 20 includes the first flange 22 disposed to extend in the radial direction R between a first support 61 and a second support 62 (which will be described below) and connected to the second support member 12 of the first engagement device 1. In the present embodiment, the second support member 12 is equivalent to a "friction plate support", and the first flange 22 is equivalent to a "radial extension".

In the present embodiment, the first engagement device 1 is a hydraulically operated engagement device including a hydraulically operated component (which is a hydraulic servo mechanism in this embodiment) that operates in accordance with an oil pressure supplied thereto. Specifically, as illustrated in FIG. 2, the first engagement device 1 includes: the piston 10 described above; an oil chamber H to move the piston 10 in the axial direction L; and an urging member 15 (which is a coil spring in this example) urging the piston 10 in a direction opposite to the direction of movement caused by an oil pressure. Moving the piston 10 in the axial direction L in accordance with the oil pressure of the oil chamber H controls the state of engagement of the first engagement device 1. Although described in detail below, the present embodiment involves defining, inside the connecting shaft 30, a first oil passage 91 through which oil is supplied to the oil chamber H, and supplying an oil pressure, which has been controlled by a hydraulic controller (not illustrated), to the oil chamber H through the first oil passage 91 as indicated by the associated broken line (which represents how the oil flows) in FIG. 2.

In the present embodiment, the first engagement device 1 is a normally open type engagement device. The oil chamber H is provided opposite, with respect to the piston 10, to a direction in which the first friction plates 13 and the second friction plates 14 are to be pressed by the piston 10. In this embodiment, the piston 10 is structured to press the first friction plates 13 and the second friction plates 14 from the first axial side L1. The oil chamber H is defined on the first axial side L1 relative to the piston 10. The urging member 15 is provided so as to urge the piston 10 to the first axial side L1.

In the present embodiment, the first engagement device 1 is a wet friction engagement device. Although described in detail below, the present embodiment involves defining, inside the connecting shaft 30, a second oil passage 92 through which oil is supplied to the first friction plates 13 and the second friction plates 14, and supplying an oil pressure, which has been controlled by a hydraulic controller (not illustrated), to the first friction plates 13 and the second friction plates 14 through the second oil passage 92 from the radially inner side R2 as indicated by the associated broken line (which represents how the oil flows) in FIG. 2. The oil supplied to the first friction plates 13 and the second friction plates 14 from the radially inner side R2 flows to the radially outer side R1 between the first friction plates 13 and the second friction plates 14 while cooling the friction plates. Although not described in detail, the present embodiment involves supplying the oil, which has cooled the first friction plates 13 and the second friction plates 14, to the rotary electric machine MG so as to cool the rotary electric machine MG.

The following description discusses a structure for supporting the components of the vehicle drive apparatus 100 according to the present embodiment relative to the case 4. As illustrated in FIG. 2, the case 4 includes: a first wall 41 disposed on the first axial side L1 relative to the rotary electric machine MG; and a second wall 42 disposed on the second axial side L2 relative to the rotary electric machine MG. Although not illustrated in detail, the case 4 includes a peripheral wall surrounding the rotary electric machine MG from the radially outer side R1, and an intra-case space surrounded and defined by the peripheral wall includes a space which is defined between the first wall 41 and the second wall 42 in the axial direction L and in which the rotary electric machine MG is housed. In the present embodiment, the first engagement device 1 is also housed in this space. The intra-case space surrounded and defined by the peripheral wall includes a space which is defined on the first axial side L1 relative to the first wall 41 and in which the torque converter TC is housed. The first wall 41 and the second wall 42 may be integral with the peripheral wall such that the first wall 41 and the second wall 42 extend to the radially inner side R2 from the peripheral wall, or may be separate components secured to the peripheral wall (i.e., components separate from the peripheral wall of the case 4).

The first wall 41 is formed to extend in the radial direction R. In the present embodiment, the first wall 41 has an annular shape coaxial with the axis X in an axial view along the axial direction L. In other words, the first wall 41 includes a disk-shaped wall extending not only in the radial direction R but also in a circumferential direction. As illustrated in FIG. 3, a central portion of the first wall 41 in the radial direction R (i.e., an end of the first wall 41 on the radially inner side R2) is provided with a third tubular portion 43 having a tubular shape (which is a cylindrical shape in this embodiment) extending in the axial direction L. In this embodiment, the third tubular portion 43 is formed to protrude to the second axial side L2 relative to a portion of the first wall 41 adjacent to the third tubular portion 43 on the radially outer side R1. The connecting shaft 30 is inserted through a through hole surrounded and defined by an inner peripheral surface of the third tubular portion 43 and passing through the first wall 41 in the axial direction L. Through the connecting shaft 30 disposed to pass through the first wall 41 in the axial direction L, the rotary electric machine MG disposed on the second axial side L2 relative to the first wall 41 is connected to the torque converter TC disposed on the first axial side L1 relative to the first wall 41.

The second wall 42 is formed to extend in the radial direction R. In the present embodiment, the second wall 42 has an annular shape coaxial with the axis X in the axial view. In other words, the second wall 42 includes a disk-shaped wall extending not only in the radial direction R but also in the circumferential direction. The input member 20 is inserted through a through hole defined in a central portion of the second wall 42 in the radial direction R (i.e., an end of the second wall 42 on the radially inner side R2). Through the input member 20 disposed to pass through the second wall 42 in the axial direction L, the internal combustion engine E (or a device, such as a damper, drivingly connected to the internal combustion engine E) disposed on the second axial side L2 relative to the second wall 42 is connected to the first engagement device 1 disposed on the first axial side L1 relative to the second wall 42.

The rotor Ro of the rotary electric machine MG is supported by the rotor support member 60. The rotor Ro is supported, with its movement in each direction relative to the rotor support member 60 being restricted. The rotor support member 60 supports the rotor Ro from the radially inner side R2. As illustrated in FIG. 2, the rotor support member 60 includes: the rotor support 63 having a cylindrical shape extending in the axial direction L and supporting the rotor Ro from the radially inner side R2; and the first and second supports 61 and 62 each formed to extend in the radial direction R and supporting the rotor support 63 from the radially inner side R2. The first support 61 is disposed to extend to the radially inner side R2 from the rotor support 63 between the first engagement device 1 and the first wall 41 in the axial direction L. The oil chamber H described above is defined between the first support 61 and the piston 10. The second support 62 is disposed to extend to the radially inner side R2 from the rotor support 63 between the first engagement device 1 and the second wall 42 in the axial direction L. The second support 62 is disposed on the second axial side L2 relative to the first support 61. The first engagement device 1 is disposed between the first support 61 and the second support 62 in the axial direction L.

As illustrated in FIG. 3, the rotor support member 60 includes a first tubular portion 71 having a tubular shape (which is a cylindrical shape in this embodiment) extending in the axial direction L and fitted to an outer peripheral surface of the connecting shaft 30. The first tubular portion 71 is disposed on the second axial side L2 relative to the third tubular portion 43 of the first wall 41. In this embodiment, the first tubular portion 71 is disposed adjacent to the third tubular portion 43 on the second axial side L2. The first tubular portion 71 is fitted to the outer peripheral surface of a portion of the connecting shaft 30 disposed on the second axial side L2 relative to the third tubular portion 43. In the present embodiment, the first tubular portion 71 is formed in a central portion of the first support 61 in the radial direction R (i.e., an end of the first support 61 on the radially inner side R2). In this embodiment, the first tubular portion 71 is formed to protrude to the second axial side L2 relative to a portion of the first support 61 adjacent to the first tubular portion 71 on the radially outer side R1. In the present embodiment, the first tubular portion 71 is equivalent to a "tubular portion".

The first tubular portion 71 and the connecting shaft 30 are connected to each other through a connector 6 such that the first tubular portion 71 and the connecting shaft 30 rotate together. Thus, the rotor support member 60 including the first tubular portion 71 is connected to the connecting shaft 30 such that the rotor support member 60 rotates together with the connecting shaft 30. In other words, the rotor Ro is connected to the connecting shaft 30 through the rotor support member 60 such that the rotor Ro rotates together with the connecting shaft 30. Specifically, an inner peripheral engagement portion formed on an inner peripheral surface of the first tubular portion 71 (i.e., an end of the inner peripheral surface on the second axial side L2 in this embodiment) and an outer peripheral engagement portion formed on the outer peripheral surface of the connecting shaft 30 are in engagement with each other through the connector 6. Accordingly, the first tubular portion 71 and the connecting shaft 30 are connected to each other such that the first tubular portion 71 and the connecting shaft 30 rotate together. In this embodiment, the inner peripheral engagement portion formed on the inner peripheral surface of the first tubular portion 71 is formed to extend in the axial direction L and includes internal teeth (inner peripheral spline teeth) arranged in the circumferential direction, and the external teeth engagement portion formed on the outer peripheral surface of the connecting shaft 30 is formed to extend in the axial direction L and includes external teeth (outer peripheral spline teeth) arranged in the circumferential direction. The inner peripheral engagement portion formed on the inner peripheral surface of the first tubular portion 71 and the outer peripheral engagement portion formed on the outer peripheral surface of the connecting shaft 30 are in spline engagement with each other through the connector 6. The connector 6 thus connects the first tubular portion 71 and the connecting shaft 30 to each other in such a manner as to allow the first tubular portion 71 and the connecting shaft 30 to move relative to each other in the axial direction L and prevent the first tubular portion 71 and the connecting shaft 30 from rotating relative to each other in the circumferential direction.

The vehicle drive apparatus 100 includes a first bearing B1 supporting the rotor support member 60 such that the rotor support member 60 is rotatable relative to the case 4. In the present embodiment, the vehicle drive apparatus 100 further includes a third bearing B3 supporting the rotor support member 60 such that the rotor support member 60 is rotatable relative to the case 4. As illustrated in FIG. 2, the first bearing B1 is disposed on the first axial side L1 relative to the first engagement device 1, and the third bearing B3 is disposed on the second axial side L2 relative to the first engagement device 1. In the present embodiment, the first bearing B1 and the third bearing B3 are bearings equal in diameter. In the present embodiment, ball bearings are used as the first bearing B1 and the third bearing B3. In this embodiment, ball bearings of the same type are used as the first bearing B1 and the third bearing B3.

In the present embodiment, the rotor Ro, which is supported by the rotor support member 60, is supported by the first bearing B1 and the third bearing B3 on both sides in the axial direction L such that the rotor Ro is rotatable relative to the case 4. Specifically, the first bearing B1 is disposed between the first support 61 and the first wall 41, and the third bearing B3 is disposed between the second support 62 and the second wall 42. The rotor Ro, which is supported by the rotor support member 60, is supported by the first bearing B1 such that the rotor Ro is rotatable relative to the first wall 41 and is supported by the third bearing B3 such that the rotor Ro is rotatable relative to the second wall 42.

As illustrated in FIG. 3, the first bearing B1, which is disposed in abutment with the rotor support member 60 (or specifically, the first support 61) from the first axial side L1 and one side in the radial direction R (which is the radially outer side R1 in the present embodiment), supports the rotor support member 60 in the axial direction L and the radial direction R. The first bearing B1 is disposed in abutment with the case 4 (or specifically, the first wall 41) from the second axial side L2 and the other side in the radial direction R (which is the radially inner side R2 in the present embodiment). This enables the first bearing B1 disposed on the first wall 41 to receive a load exerted on the rotor support member 60 to the first axial side L1. In other words, the first bearing B1 restricts movement of the rotor support member 60 to the first axial side L1. As described above, the first bearing B1 is a bearing that is disposed between the rotor support member 60 and the case 4 in the radial direction R so as to restrict movement of the rotor support member 60 to the first axial side L1 relative to the case 4. The rotor support member 60 includes the first support 61 whose movement to the first axial side L1 relative to the case 4 is restricted by the first bearing B1. The term "in abutment with" as used herein for the location of a bearing refers to being in abutment with at least an abutment target, with no clearance left between the bearing and the abutment target in a region where the bearing is disposed.

Specifically, the first support 61 includes a second tubular portion 72 having a tubular shape (which is a cylindrical shape in this embodiment) extending in the axial direction L. The second tubular portion 72 is formed to protrude to the first axial side L1 relative to a portion of the first support 61 adjacent to the second tubular portion 72 in the radial direction R. In this embodiment, the second tubular portion 72 is disposed on the radially outer side R1 relative to the third tubular portion 43 of the first wall 41 such that the second tubular portion 72 overlaps with the third tubular portion 43 in a radial view. The first wall 41 includes a fourth tubular portion 44 having a tubular shape (which is a cylindrical shape in this embodiment) extending in the axial direction L. The fourth tubular portion 44 is formed to protrude to the second axial side L2 relative to a portion of the first wall 41 adjacent to the fourth tubular portion 44 in the radial direction R. The fourth tubular portion 44 is disposed to overlap with the second tubular portion 72 in a radial view. In the present embodiment, the fourth tubular portion 44 is disposed on the radially outer side R1 relative to the second tubular portion 72 such that the fourth tubular portion 44 overlaps with the second tubular portion 72 in the radial view. When the fourth tubular portion 44 is disposed on the radially inner side R2 relative to the second tubular portion 72 such that the fourth tubular portion 44 overlaps with the second tubular portion 72 in the radial view, the fourth tubular portion 44 may be integral with the third tubular portion 43.

The first bearing B1 is disposed in a space sandwiched between the second tubular portion 72 and the fourth tubular portion 44 from both sides in the radial direction R, such that the first bearing B1 is in abutment with each of the second tubular portion 72 and the fourth tubular portion 44. Specifically, a step portion 73 facing the first axial side L1 and including a first support surface 72a is defined on one of a pair of peripheral surfaces (i.e., an inner peripheral surface and an outer peripheral surface) of the second tubular portion 72, which is a target peripheral surface (i.e., the outer peripheral surface in the present embodiment) facing the fourth tubular portion 44 in the radial direction R. The first bearing B1 (i.e., an inner ring thereof in the present embodiment) is disposed to abut against the first support surface 72a from the first axial side L1 and abut, from one side in the radial direction R on which the fourth tubular portion 44 is disposed (which is the radially outer side R1 in the present embodiment), against a target peripheral surface (second support surface 72b) of a portion of the second tubular portion 72 located on the first axial side L1 relative to the first support surface 72a. A step portion facing the second axial side L2 and including a fourth support surface 41a is defined on one of a pair of peripheral surfaces of the fourth tubular portion 44, which is a target peripheral surface (i.e., an inner peripheral surface in the present embodiment) facing the second tubular portion 72 in the radial direction R. The first bearing B1 (i.e., an outer ring thereof in the present embodiment) is disposed to abut against the fourth support surface 41a from the second axial side L2 and abut, from the other side in the radial direction R on which the second tubular portion 72 is disposed (which is the radially inner side R2 in the present embodiment), against a target peripheral surface (fifth support surface 41b) of a portion of the fourth tubular portion 44 located on the second axial side L2 relative to the fourth support surface 41a. In the present embodiment, the first bearing B1 is disposed to overlap with the third tubular portion 43 in a radial view. In the present embodiment, the first support surface 72a is equivalent to a "step surface".

As described above, the first bearing B1 is disposed between the second support surface 72b, which is a peripheral surface of the rotor support member 60 (i.e., an outer peripheral surface thereof in this embodiment), and the fifth support surface 41b, which is a peripheral surface of the case 4 (i.e., an inner peripheral surface thereof in this embodiment), in the radial direction R. The first bearing B1 is fitted to one of the second support surface 72b and the fifth support surface 41b by loose fitting and fitted to the other one of the second support surface 72b and the fifth support surface 41b by tight fitting (or specifically, press fitting). In the present embodiment, the first bearing B1 is fitted to the second support surface 72b by loose fitting and fitted to the fifth support surface 41b by tight fitting. The step portion 73 facing the first axial side L1 and including the first support surface 72a is defined at a location on the second support surface 72b adjacent to the first bearing B1 on the second axial side L2. In this embodiment, the step portion 73 is defined such that a portion of the second support surface 72b located on the first axial side L1 relative to the first support surface 72a is smaller in diameter than a portion of the second support surface 72b located on the second axial side L2 relative to the first support surface 72a. In the present embodiment, the second support surface 72b is equivalent to a "first peripheral surface", and the fifth support surface 41b is equivalent to a "second peripheral surface".

As illustrated in FIG. 3, the third bearing B3, which is disposed in abutment with the rotor support member 60 (or specifically, the second support 62) from the second axial side L2 and one side in the radial direction R (which is the radially outer side R1 in the present embodiment), supports the rotor support member 60 in the axial direction L and the radial direction R. The third bearing B3 is disposed in abutment with the case 4 (or specifically, the second wall 42) from the first axial side L1 and the other side in the radial direction R (which is the radially inner side R2 in the present embodiment). This enables the third bearing B3 disposed on the second wall 42 to receive a load exerted on the rotor support member 60 to the second axial side L2. In other words, the third bearing B3 restricts movement of the rotor support member 60 to the second axial side L2. As described above, the third bearing B3 is a bearing that is disposed between the rotor support member 60 and the case 4 in the radial direction R so as to restrict movement of the rotor support member 60 to the second axial side L2 relative to the case 4. The rotor support member 60 includes the second support 62 whose movement to the second axial side L2 relative to the case 4 is restricted by the third bearing B3.

Specifically, the second support 62 includes a fifth tubular portion 74 having a tubular shape (which is a cylindrical shape in this embodiment) extending in the axial direction L. In this embodiment, the fifth tubular portion 74 is formed in a central portion of the second support 62 in the radial direction R (i.e., an end of the second support 62 on the radially inner side R2). The fifth tubular portion 74 is formed to protrude to the second axial side L2 relative to a portion of the second support 62 adjacent to the fifth tubular portion 74 on the radially outer side R1. The second wall 42 includes a bearing fitting portion 45 (boss portion) at a location where the bearing fitting portion 45 overlaps with the fifth tubular portion 74 in a radial view. In this embodiment, the bearing fitting portion 45 is disposed on the radially outer side R1 relative to the fifth tubular portion 74. The third bearing B3 is disposed between a peripheral surface of the fifth tubular portion 74 (which is an outer peripheral surface thereof in this embodiment) and a peripheral surface of the bearing fitting portion 45 (which is an inner peripheral surface thereof in this embodiment) in the radial direction R.

The following description discusses a structure for supporting the connecting shaft 30 in the axial direction L relative to the case 4. The vehicle drive apparatus 100 includes a second bearing B2 supporting the connecting shaft 30 such that the connecting shaft 30 is rotatable relative to the case 4. In the present embodiment, a thrust bearing is used as the second bearing B2. As illustrated in FIG. 3, the second bearing B2, which is disposed in abutment with the connecting shaft 30 from the second axial side L2, supports the connecting shaft 30 in the axial direction L. The second bearing B2 is disposed in abutment with the case 4 (or specifically, the first wall 41) from the first axial side L1. This enables the second bearing B2 disposed on the first wall 41 to receive a load exerted on the connecting shaft 30 to the second axial side L2. In other words, the second bearing B2 is able to restrict movement of the connecting shaft 30 to the second axial side L2. As described above, the second bearing B2 is a bearing that is disposed between the connecting shaft 30 and the case 4 in the axial direction L so as to restrict movement of the connecting shaft 30 to the second axial side L2 relative to the case 4. The second bearing B2 is disposed between a surface of the connecting shaft 30 (or specifically, a second flange 32 described below), facing the second axial side L2, and a surface of the case 4 (or specifically, the first wall 41), facing the first axial side L1, in the axial direction L.

Specifically, as illustrated in FIG. 3, the connecting shaft 30 includes the flange (second flange 32) on a portion of the connecting shaft 30 disposed on the first axial side L1 relative to the third tubular portion 43 of the first wall 41. The second flange 32 is formed to protrude to the radially outer side R1 relative to a portion of the connecting shaft 30 disposed inward of the third tubular portion 43 (i.e., inside a space surrounded by the inner peripheral surface of the third tubular portion 43). The second flange 32 is disposed to overlap with the first wall 41 (i.e., an end of the first wall 41 located on the radially inner side R2 in this embodiment) in an axial view. In this embodiment, the second flange 32 is disposed to overlap with the third tubular portion 43 in the axial view. The second bearing B2 is disposed in a space sandwiched between the second flange 32 and the first wall 41 from both sides in the axial direction L, such that the second bearing B2 is in abutment with each of the second flange 32 and the first wall 41. Specifically, the second bearing B2 is disposed to abut, from the second axial side L2, against a surface (third support surface 32a) of the second flange 32 facing the second axial side L2. The second bearing B2 is disposed to abut, from the first axial side L1, against a surface (sixth support surface 41c) of the first wall 41 (i.e., an end of the first wall 41 on the radially inner side R2 in this embodiment) facing the first axial side L1.

As described above, the vehicle drive apparatus 100 is structured to be able to restrict movement of the connecting shaft 30 to the second axial side L2 by the second bearing B2. This enables the case 4 to receive, through the second bearing B2 (which is dedicated to restricting movement of the connecting shaft 30 to the second axial side L2), a relatively large load exerted on the connecting shaft 30 to the second axial side L2 owing to ballooning of the torque converter TC. The vehicle drive apparatus 100 is structured to be able to restrict movement of the connecting shaft 30 to the first axial side L1 by using the above-mentioned first bearing B1, without providing any dedicated bearing to restrict movement of the connecting shaft 30 to the first axial side L1 as will be described below. This makes it possible to restrict movement of the connecting shaft 30 (which is connected to the rotor support member 60) to both sides in the axial direction L with a smaller number of components.

As illustrated in FIG. 3, the connecting shaft 30 in the present embodiment includes a protrusion 33 protruding to the second axial side L2 relative to the first tubular portion 71. A retained member 3 is retained at a location on an outer peripheral surface of the protrusion 33 adjacent to the first tubular portion 71 on the second axial side L2. In this embodiment, the retained member 3 is retained at a location adjacent to the connector 6 (which connects the first tubular portion 71 to the connecting shaft 30) on the second axial side L2. The retained member 3 is retained on the outer peripheral surface of the protrusion 33, with movement of the retained member 3 relative to the protrusion 33 in the axial direction L being restricted. At least a portion of the retained member 3 (i.e., a portion of the retained member 3 on the radially outer side R1 in the present embodiment) is disposed to face the first tubular portion 71 in the axial direction L. In other words, the retained member 3 is disposed to overlap with the first tubular portion 71 in an axial view. In the present embodiment, a snap ring is used as the retained member 3. The snap ring used as the retained member 3 is fitted into an annular groove defined in the outer peripheral surface of the protrusion 33.

As described above, the retained member 3 is retained at a location on the outer peripheral surface of the protrusion 33 adjacent to the first tubular portion 71 on the second axial side L2. Thus, a load exerted on the connecting shaft 30 to the first axial side L1 is transmitted through the retained member 3 to the rotor support member 60 including the first tubular portion 71. This restricts movement of the connecting shaft 30 to the first axial side L1 relative to the first tubular portion 71. In this embodiment, the vehicle drive apparatus 100 is structured to enable the first bearing B1 to receive a load exerted on the rotor support member 60 to the first axial side L1 as described above. Accordingly, the first bearing B1 is able to receive a load transmitted from the connecting shaft 30 to the rotor support member 60 through the retained member 3 and exerted to the first axial side L1. Consequently, the first bearing B1 is able to restrict movement of the connecting shaft 30 to the first axial side L1.

The present embodiment involves providing the retained member 3 at a location on the outer peripheral surface of the protrusion 33 adjacent to the first tubular portion 71 on the second axial side L2, thus restricting movement of the connecting shaft 30 to the first axial side L1 relative to the first tubular portion 71. The structure for restricting movement of the connecting shaft 30 to the first axial side L1 relative to the first tubular portion 71, however, may be any other structure. In one example, a fastening member (e.g., a bolt) screwed to an end of the connecting shaft 30 on the second axial side L2 may be used to restrict movement of the connecting shaft 30 to the first axial side L1 relative to the first tubular portion 71.

In the present embodiment, the protrusion 33 and the second flange 32 of the connecting shaft 30 and a portion of the connecting shaft 30 between the protrusion 33 and the second flange 32 in the axial direction L (i.e., a portion of the connecting shaft 30 through which the protrusion 33 is connected to the second flange 32) are integral with each other. In this embodiment, the connecting shaft 30 consists of a single member. The outer peripheral surface of a portion of the connecting shaft 30 inserted through the through hole of the first wall 41 (i.e., the through hole surrounded and defined by the inner peripheral surface of the third tubular portion 43) and the outer peripheral surface of a portion of the connecting shaft 30 located on the second axial side L2 relative to the inserted portion are each smaller in diameter than the through hole of the first wall 41. The connecting shaft 30 is inserted through the through hole of the first wall 41 from the first axial side L1 such that a tip of the connecting shaft 30 on the second axial side L2 protrudes to the second axial side L2 relative to the first tubular portion 71.

As illustrated in FIG. 3, the present embodiment involves disposing bearings each capable of receiving a load exerted in the axial direction L, such that one of the bearings is located between the connecting shaft 30 and the input member 20 in the axial direction L and the other one of the bearings is located between the input member 20 and the rotor support member 60 in the axial direction L. Specifically, a seventh bearing B7 (which is a thrust bearing in this example) is disposed between the input member 20 and the connecting shaft 30 in the axial direction L, and an eighth bearing B8 (which is a thrust bearing in this example) is disposed between the input member 20 (or specifically, the first flange 22) and the rotor support member 60 (or specifically, the second support 62) in the axial direction L. The seventh bearing B7 is disposed in abutment with the input member 20 from the first axial side L1 and in abutment with the connecting shaft 30 from the second axial side L2. The eighth bearing B8 is disposed in abutment with the input member 20 (or specifically, the first flange 22) from the second axial side L2 and in abutment with the rotor support member 60 (or specifically, the second support 62) from the first axial side L1. In other words, the eighth bearing B8 disposed between the input member 20 and the rotor support member 60 in the axial direction L is located between the first flange 22 and the second support 62 in the axial direction L. Thus, the connecting shaft 30 whose movement to the first axial side L1 is restricted receives a load exerted on the input member 20 to the first axial side L1, and the rotor support member 60 whose movement to the second axial side L2 is restricted receives a load exerted on the input member 20 to the second axial side L2. This makes it possible to restrict movement of the input member 20 to both sides in the axial direction L. In the present embodiment, the seventh bearing B7 and the eighth bearing B8 are each equivalent to a "bearing capable of receiving a load exerted in an axial direction".

The following description discusses a structure for supporting the connecting shaft 30 in the radial direction R relative to the case 4. As will be described below, the present embodiment involves using a structure for supporting the input member 20 in the radial direction R relative to the case 4, so that the connecting shaft 30 is directly supported in the radial direction R relative to the case 4 at a single location. Thus, the length of a portion of the case 4 disposed to face the outer peripheral surface of the connecting shaft 30 (or specifically, the third tubular portion 43), which is measured in the axial direction L, is shorter than when the connecting shaft 30 is directly supported in the radial direction R relative to the case 4 at two locations. Consequently, the present embodiment is able to provide a structure that allows the rotor support member 60 to include the first tubular portion 71 fitted to the outer peripheral surface of the connecting shaft 30, while limiting or preventing an increase in the size of an entirety of the apparatus in the axial direction L.

As illustrated in FIG. 3, the present embodiment involves disposing a first end 21 (which is an end of the input member 20 on the first axial side L1) such that the first end 21 is located inward of a second end 31 (which is an end of the connecting shaft 30 on the second axial side L2) in the radial direction R and overlaps with the second end 31 in a radial view. Specifically, the second end 31 of the connecting shaft 30 has a tubular shape (which is a cylindrical shape in this embodiment) extending in the axial direction L, and the first end 21 of the input member 20 has a tubular shape (which is a cylindrical shape in this embodiment) extending in the axial direction L and including an outer peripheral surface smaller in diameter than an inner peripheral surface of the second end 31. The first end 21 is inserted, from the second axial side L2, into a space surrounded by the inner peripheral surface of the second end 31.

The present embodiment involves disposing bearings each capable of receiving a load exerted in the radial direction R, such that one of the bearings is located between the case 4 and the outer peripheral surface of the connecting shaft 30 in the radial direction R, another one of the bearings is located between the case 4 and the outer peripheral surface of the input member 20 in the radial direction R, and still another one of the bearings is located between the first end 21 and the second end 31 in the radial direction R. Specifically, a fourth bearing B4 is disposed between the inner peripheral surface of the third tubular portion 43 of the first wall 41 and the outer peripheral surface of the connecting shaft 30 in the radial direction R, a fifth bearing B5 is disposed between the inner peripheral surface of an end of the second wall 42 on the radially inner side R2 and the outer peripheral surface of the input member 20 in the radial direction R, and a sixth bearing B6 is disposed between the outer peripheral surface of the first end 21 and the inner peripheral surface of the second end 31 in the radial direction R. In the present embodiment, a portion of the connecting shaft 30 on the first axial side L1 is thus directly supported in the radial direction R relative to the case 4 through the fourth bearing B4, and a portion of the connecting shaft 30 on the second axial side L2 is thus indirectly supported in the radial direction R relative to the case 4 through the sixth bearing B6 (or specifically, through the input member 20 directly supported in the radial direction R relative to the case 4 by the fifth bearing B5). In the present embodiment, needle bearings are used as the fourth bearing B4, the fifth bearing B5, and the sixth bearing B6. In the present embodiment, the fourth bearing B4, the fifth bearing B5, and the sixth bearing B6 are each equivalent to a "bearing capable of receiving a load exerted in a radial direction".

Relative movement of the connecting shaft 30, the rotor support member 60, and the input member 20 with respect to the case 4 in the axial direction L is allowed within a range responsive to clearances (or plays) present, for example, in regions where the bearings are disposed. In the present embodiment, a clearance is created between the first tubular portion 71 and the retained member 3 in the axial direction L, with the rotor support member 60 moved farthest to the second axial side L2 relative to the case 4 and the connecting shaft 30 moved farthest to the second axial side L2 relative to the case 4. In other words, the clearance between the first tubular portion 71 and the retained member 3 in the axial direction L is created, with each of the rotor support member 60 and the connecting shaft 30 moved to its fullest extent to the second axial side L2. Thus, when a load resulting from, for example, inertial force is exerted on the rotor Ro to the second axial side L2 and causes the rotor support member 60 (which supports the rotor Ro) to move to the second axial side L2, the present embodiment is able to enable the case 4 to receive, through the third bearing B3, a load exerted on the rotor support member 60 to the second axial side L2 while preventing this load from being transmitted to the second bearing B2 through the retained member 3. For example, when the vehicle drive apparatus 100 is installed on a vehicle such that the second axial side L2 is oriented toward the front side of a vehicle body, inertial force may cause a load to be exerted on the rotor Ro and/or the rotor support member 60 to the second axial side L2 during deceleration of the vehicle.

In the present embodiment, a clearance is created between the connecting shaft 30 and the input member 20 in the axial direction L, with the connecting shaft 30 moved farthest to the second axial side L2 relative to the case 4 and the input member 20 moved farthest to the second axial side L2 relative to the case 4. In other words, the clearance between the connecting shaft 30 and the input member 20 in the axial direction L is created, with each of the connecting shaft 30 and the input member 20 moved to its fullest extent to the second axial side L2. In the present embodiment, the clearance between the connecting shaft 30 and the input member 20 in the axial direction L is created in a region where the seventh bearing B7 is disposed. The present embodiment is thus able to prevent a relatively large load, which is exerted on the connecting shaft 30 to the second axial side L2 owing to ballooning of the torque converter TC, from being transmitted to the third bearing B3 through the input member 20.

The following description discusses a structure for supplying oil to the first engagement device 1 of the vehicle drive apparatus 100 according to the present embodiment. As illustrated in FIG. 3, the present embodiment involves defining, in portions of the connecting shaft 30 disposed inward of the first tubular portion 71, the oil passages through which oil is supplied to the first engagement device 1. Specifically, the present embodiment involves defining, in at least portions of the connecting shaft 30 disposed inward of the first tubular portion 71, the first oil passage 91 through which oil is supplied to the oil chamber H of the first engagement device 1 and the second oil passage 92 through which oil is supplied to the first friction plates 13 and the second friction plates 14 of the first engagement device 1. The first oil passage 91 and the second oil passage 92 are defined at different locations inside the connecting shaft 30, such that the first oil passage 91 and the second oil passage 92 extend along the axial direction L (i.e., in parallel with the axial direction L in this embodiment). In the present embodiment, the first oil passage 91 and the second oil passage 92 are each equivalent to an "oil passage through which oil is supplied to a first engagement device".

In the present embodiment, the oil pressure, which has been controlled by the hydraulic controller (not illustrated), is supplied to the oil chamber H through a third oil passage 93 (which is defined in the first wall 41) and the first oil passage 91 in this order. In the present embodiment, a sleeve member 5 is disposed between the outer peripheral surface of the connecting shaft 30 and the inner peripheral surface of the third tubular portion 43 of the first wall 41. The oil in the third oil passage 93 is supplied to the first oil passage 91 through an oil hole (which is defined in the sleeve member 5 such that the inner peripheral surface and outer peripheral surface of the sleeve member 5 are in communication with each other) and a first oil hole 81 (which is defined in the connecting shaft 30 such that the first oil passage 91 is in communication with the outer peripheral surface of the connecting shaft 30) in this order. As indicated by the associated broken line (which represents how the oil flows) in FIG. 2, the oil in the first oil passage 91 is supplied to the oil chamber H through a second oil hole 82 (which is defined in the connecting shaft 30 such that the first oil passage 91 is in communication with the outer peripheral surface of the connecting shaft 30) and a third oil hole 83 (which is defined in the first tubular portion 71 such that the inner peripheral surface and outer peripheral surface of the first tubular portion 71 are in communication with each other) in this order.

In the present embodiment, the oil pressure, which has been controlled by the hydraulic controller (not illustrated), is supplied to the first friction plates 13 and the second friction plates 14 from the radially inner side R2 through a fourth oil passage 94 (which is defined in the first wall 41) and the second oil passage 92 in this order. Specifically, the oil in the fourth oil passage 94 is supplied to the second oil passage 92 through an oil hole (which is defined in the sleeve member 5 such that the inner peripheral surface and outer peripheral surface of the sleeve member 5 are in communication with each other) and a fourth oil hole 84 (which is defined in the connecting shaft 30 such that the second oil passage 92 is in communication with the outer peripheral surface of the connecting shaft 30) in this order. An end of the second oil passage 92 located on the second axial side L2 is in communication with a space surrounded by the inner peripheral surface of the second end 31. As indicated by the associated broken line (which represents how the oil flows) in FIG. 2, the oil in the second oil passage 92 is supplied to the first friction plates 13 and the second friction plates 14 from the radially inner side R2 through the space surrounded by the inner peripheral surface of the second end 31, a space surrounded by the inner peripheral surface of the first end 21, a fifth oil hole 85 (which is defined in the first end 21 such that the inner peripheral surface and outer peripheral surface of the first end 21 are in communication with each other), and an oil groove 80 (which is defined in an end face of the second end 31 on the second axial side L2 such that the inner peripheral surface and outer peripheral surface of the second end 31 are in communication with each other) in this order. In this case, centrifugal force resulting from rotation of the input member 20 and/or the connecting shaft 30 may be used to allow the oil to flow to the radially outer side R1.

As described above, the present embodiment involves defining, inside the connecting shaft 30, axial oil passages through which oil flows toward oil supply portions for the first engagement device 1 in the axial direction L (i.e., the first oil passage 91 through which oil flows toward the second oil hole 82 in the axial direction L and the second oil passage 92 through which oil flows toward the second end 31 in the axial direction L). Thus, the diameter of the outer peripheral surface of the third tubular portion 43 is reduced more easily than when such axial oil passages are defined in the third tubular portion 43 of the first wall 41 and/or a member disposed between the outer peripheral surface of the connecting shaft 30 and the inner peripheral surface of the third tubular portion 43. Accordingly, the present embodiment is able to reduce the diameter of the second tubular portion 72 (which is disposed on the radially outer side R1 relative to the third tubular portion 43 such that the second tubular portion 72 overlaps with the third tubular portion 43 in a radial view), making it possible to reduce the diameter of the first bearing B1 (i.e., to reduce the diameter of the first bearing B1 to such an extent that the first bearing B1 may be equal in diameter to the third bearing B3).

Alternative Embodiments

Alternative embodiments of the vehicle drive apparatus will be described below.

(1) The structure for supplying oil to the first engagement device 1 has been described by way of example in the above embodiment. Changes may be made to the structure for supplying oil to the first engagement device 1 as appropriate. In one example, oil passage(s) having functions similar to those of at least an upstream portion of the first oil passage 91 (i.e., a portion of the first oil passage 91 adjacent to a connection with the third oil passage 93) may be defined in the third tubular portion 43 of the first wall 41 and/or a member disposed between the outer peripheral surface of the connecting shaft 30 and the inner peripheral surface of the third tubular portion 43. In another example, oil passage(s) having functions similar to those of at least an upstream portion of the second oil passage 92 (i.e., a portion of the second oil passage 92 adjacent to a connection with the fourth oil passage 94) may be defined in the third tubular portion 43 of the first wall 41 and/or a member disposed between the outer peripheral surface of the connecting shaft 30 and the inner peripheral surface of the third tubular portion 43. When such structure(s) is/are used, a portion of the connecting shaft 30 disposed inward of the first tubular portion 71 may be provided with no oil passage through which oil is supplied to the first engagement device 1, unlike the foregoing embodiment.

(2) The foregoing embodiment has been described by way of example as having a structure in which the first end 21 (which is an end of the input member 20 on the first axial side L1) is disposed inward of the second end 31 (which is an end of the connecting shaft 30 on the second axial side L2) in the radial direction R such that the first end 21 overlaps with the second end 31 in a radial view. The present disclosure, however, is not limited to this structure. The first end 21 may be disposed outward of the second end 31 in the radial direction R such that the first end 21 overlaps with the second end 31 in a radial view. In this case, the sixth bearing B6 is disposed between the inner peripheral surface of the first end 21 and the outer peripheral surface of the second end 31 in the radial direction R unlike the foregoing embodiment.

(3) The foregoing embodiment has been described by way of example as having a structure in which the connecting shaft 30 is directly supported in the radial direction R relative to the case 4 at a single location. The present disclosure, however, is not limited to this structure. The connecting shaft 30 may be directly supported in the radial direction R relative to the case 4 not at a single location but at two locations in the axial direction L. Specifically, bearings each capable of receiving a load exerted in the radial direction R may be disposed at two locations in the axial direction L, which are located between the case 4 (e.g., the third tubular portion 43 of the first wall 41) and the outer peripheral surface of the connecting shaft 30 in the radial direction R. When such a structure is used, the first end 21 (which is an end of the input member 20 on the first axial side L1) may be disposed such that the first end 21 does not overlap with the second end 31 (which is an end of the connecting shaft 30 on the second axial side L2) in a radial view unlike the foregoing embodiment, which means that the first end 21 may be disposed on the second axial side L2 relative to the second end 31.

(4) The foregoing embodiment has been described by way of example as having a structure in which the first bearing B1 and the third bearing B3 are bearings equal in diameter. The present disclosure, however, is not limited to this structure. The first bearing B1 and the third bearing B3 may be bearings different in diameter.

(5) The foregoing embodiment has been described by way of example as having a structure in which the vehicle drive apparatus 100 includes the first engagement device 1 located on the radially inner side R2 relative to the rotor Ro and overlapping with the rotor Ro in a radial view. The present disclosure, however, is not limited to this structure. The vehicle drive apparatus 100 may include the first engagement device 1 located in alignment with the rotor Ro in the axial direction L, or the vehicle drive apparatus 100 may include the first engagement device 1 whose axis is different from the axis of the rotor Ro.

(6) The structure of the vehicle drive apparatus 100 has been described by way of example in the foregoing embodiment. Changes may be made to the structure of the vehicle drive apparatus 100 as appropriate. For example, the foregoing embodiment has been described by way of example as having a structure in which the vehicle drive apparatus 100 includes the input member 20 (which is drivingly connected to the internal combustion engine E) and the transmission TM. Alternatively, the vehicle drive apparatus 100 may not include at least one of the input member 20 and the transmission TM. When the vehicle drive apparatus 100 includes no input member 20, the vehicle drive apparatus 100 may be, for example, an apparatus for driving a vehicle (e.g., an electric vehicle) that includes the rotary electric machine MG serving as a sole driving force source for the wheels W.

(7) The structure(s) disclosed in the above-described embodiments may be combined with structure(s) disclosed in other embodiment(s) for application, as long as no contradiction arises. The present disclosure includes any combination of the alternative embodiments described above. Other structures of the embodiments disclosed herein are only illustrative in all respects. Accordingly, various changes may be made as appropriate without departing from the spirit of the present disclosure.

Summary of Above Embodiments

A summary of the vehicle drive apparatus described above will be given below.

A vehicle drive apparatus (100) includes: a rotary electric machine (MG) serving as a driving force source for a wheel (W); a rotor support member (60) supporting a rotor (Ro) of the rotary electric machine (MG); a connecting shaft (30) connected to the rotor support member (60); a fluid transmission device (TC) connected to the rotor support member (60) through the connecting shaft (30); and a case (4) housing the rotary electric machine (MG), the rotor support member (60), the connecting shaft (30), and the fluid transmission device (TC). One side in an axial direction (L) is a first axial side (L1), and the other side opposite to the first axial side (L1) in the axial direction (L) is a second axial side (L2). The vehicle drive apparatus (100) further includes: a first bearing (B1) disposed between the rotor support member (60) and the case (4) in a radial direction (R) so as to restrict movement of the rotor support member (60) to the first axial side (L1) relative to the case (4); and a second bearing (B2) disposed between the connecting shaft (30) and the case (4) in the axial direction (L) so as to restrict movement of the connecting shaft (30) to the second axial side (L2) relative to the case (4). The fluid transmission device (TC) is disposed on the first axial side (L1) relative to the connecting shaft (30). The rotor support member (60) includes a tubular portion (71) having a tubular shape extending in the axial direction (L) and fitted to an outer peripheral surface of the connecting shaft (30). Movement of the connecting shaft (30) to the first axial side (L1) relative to the tubular portion (71) is restricted.

In this structure, the fluid transmission device (TC) connected to the rotor support member (60) through the connecting shaft (30) is disposed on the first axial side (L1) relative to the connecting shaft (30), so that a relatively large load may be exerted on the connecting shaft (30) to the second axial side (L2) owing to ballooning of the fluid transmission device (TC). In this respect, the above structure involves disposing the second bearing (B2) between the connecting shaft (30) and the case (4) in the axial direction (L) so as to restrict movement of the connecting shaft (30) to the second axial side (L2) relative to the case (4). Accordingly, the load exerted on the connecting shaft (30) to the second axial side (L2) is receivable by the case (4) through the second bearing (B2).

A load may also be exerted on the connecting shaft (30) to the first axial side (L1), although this load is extremely smaller than a load resulting from ballooning of the fluid transmission device (TC). In this respect, the above structure involves restricting movement of the connecting shaft (30) to the first axial side (L1) relative to the tubular portion (71) of the rotor support member (60). The load exerted on the connecting shaft (30) to the first axial side (L1) is thus transmitted to the rotor support member (60). In the above structure, the first bearing (B1) disposed between the rotor support member (60) and the case (4) in the radial direction (R) restricts movement of the rotor support member (60) to the first axial side (L1) relative to the case (4). Accordingly, a load transmitted from the connecting shaft (30) to the rotor support member (60) and exerted to the first axial side (L1) is receivable by the case (4) through the first bearing (B1). In other words, the above structure is able to restrict movement of the connecting shaft (30) to the first axial side (L1) by using the first bearing (B1). Because the load that may be exerted on the connecting shaft (30) to the first axial side (L1) is relatively small, the use of the first bearing (B1) disposed between the rotor support member (60) and the case (4) in the radial direction (R) makes it possible to suitably restrict movement of the connecting shaft (30) to the first axial side (L1) without having to provide any dedicated bearing to restrict movement of the connecting shaft (30) to the first axial side (L1).

As described above, the above structure enables the case (4) to receive, through the second bearing (B2) dedicated to restricting movement of the connecting shaft (30) to the second axial side (L2), a relatively large load that may be exerted on the connecting shaft (30) to the second axial side (L2), and enables the case (4) to receive, through the first bearing (B1) disposed between the rotor support member (60) and the case (4) in the radial direction (R), a relatively small load that may be exerted on the connecting shaft (30) to the first axial side (L1) without providing any dedicated bearing to restrict movement of the connecting shaft (30) to the first axial side (L1). Accordingly, the above structure is able to restrict movement of the connecting shaft (30) to both sides in the axial direction (L) with a smaller number of components than a structure that requires a dedicated bearing to restrict movement of the connecting shaft (30) to the first axial side (L1).

In this embodiment, the connecting shaft (30) preferably includes a protrusion (33) protruding to the second axial side (L2) relative to the tubular portion (71), and a retained member (3) is preferably retained at a location on an outer peripheral surface of the protrusion (33) adjacent to the tubular portion (71) on the second axial side (L2).

In this structure, the movable range of connecting shaft (30) relative to the tubular portion (71) in the axial direction (L) is limited to a range located on the second axial side (L2) relative to a location where the retained member (3) abuts against the tubular portion (71), thus making it possible to restrict movement of the connecting shaft (30) to the first axial side (L1) relative to the tubular portion (71). In this structure, a load exerted on the connecting shaft (30) to the first axial side (L1) is transmittable to the rotor support member (60) through the retained member (3) and receivable by the case (4) through the first bearing (B1).

The vehicle drive apparatus (100) structured such that the retained member (3) is retained at the location on the outer peripheral surface of the protrusion (33) adjacent to the tubular portion (71) on the second axial side (L2) as described above preferably further includes a third bearing (B3) disposed between the rotor support member (60) and the case (4) in the radial direction (R) so as to restrict movement of the rotor support member (60) to the second axial side (L2) relative to the case (4). A clearance is preferably created between the tubular portion (71) and the retained member (3) in the axial direction (L), with the rotor support member (60) moved farthest to the second axial side (L2) relative to the case (4) and the connecting shaft (30) moved farthest to the second axial side (L2) relative to the case (4).

When a load resulting from, for example, inertial force is exerted on the rotor (Ro) to the second axial side (L2) and causes the rotor support member (60), which supports the rotor (Ro), to the second axial side (L2), this structure enables the case (4) to receive, through the third bearing (B3), a load exerted on the rotor support member (60) to the second axial side (L2) while preventing this load from being transmitted to the second bearing (B2) through the retained member (3). Accordingly, the case (4) does not have to receive, through the second bearing (B2), the load exerted on the rotor support member (60) to the second axial side (L2), making it possible to prevent or limit an increase in the size of the second bearing (B2).

In the vehicle drive apparatus (100) having any of the above structures, the first bearing (B1) is preferably disposed between a first peripheral surface (72b) and a second peripheral surface (41b) in the radial direction (R), the first peripheral surface (72b) being a peripheral surface of the rotor support member (60), the second peripheral surface (41b) being a peripheral surface of the case (4). The first bearing (B1) is preferably fitted to the first peripheral surface (72b) by loose fitting and fitted to the second peripheral surface (41b) by tight fitting. A step portion (73) including a step surface (72a) facing the first axial side (L1) is preferably defined at a location on the first peripheral surface (72b) adjacent to the first bearing (B1) on the second axial side (L2).

In this structure, the movable range of the rotor support member (60) relative to the case (4) in the axial direction (L) is limitable to a range located on the second axial side (L2) relative to a location where the step surface (72a) abuts against the first bearing (B1). Thus, the first bearing (B1) disposed between the rotor support member (60) and the case (4) in the radial direction (R) is able to suitably restrict movement of the rotor support member (60) to the first axial side (L1) relative to the case (4).

The vehicle drive apparatus (100) preferably further includes: an input member (20) drivingly connected to an internal combustion engine (E); and a friction engagement device (1) to connect and disconnect the input member (20) to and from the rotary electric machine (MG). The friction engagement device (1) is preferably disposed at a location inward of the rotor (Ro) in the radial direction (R) and overlapping with the rotor (Ro) in a radial view along the radial direction (R). An oil passage (91, 92) through which oil is supplied to the friction engagement device (1) is preferably defined in a portion of the connecting shaft (30) disposed inward of the tubular portion (71).

This structure enables the oil passage (91, 92), through which oil flows toward an oil supply portion for the friction engagement device (1) in the axial direction (L), to be defined inside the connecting shaft (30). Thus, a member to define such an oil passage does not have to be disposed between the connecting shaft (30) and the rotor support member (60) in the radial direction (R), making it possible to reduce the number of components. The connecting shaft (30) is usually provided to extend over a relatively wide range in the axial direction (L). Accordingly, the oil passage (91, 92), through which oil flows toward the oil supply portion for the friction engagement device (1) in the axial direction (L), is defined inside the connecting shaft (30) so as to make it possible to reduce, for example, the number of oil relay points, thus simplifying an oil supply structure for the friction engagement device (1). When a vehicle travels without using any driving force from the internal combustion engine (E), disconnecting the input member (20) from the rotary electric machine (MG) by the friction engagement device (1) makes it possible to prevent or reduce occurrence of energy loss caused by drag of the internal combustion engine (E).

The vehicle drive apparatus (100) structured such that the oil passage (91, 92) through which oil is supplied to the friction engagement device (1) is defined in a portion of the connecting shaft (30) disposed inward of the tubular portion (71) as described above preferably further includes a third bearing (B3) disposed between the rotor support member (60) and the case (4) in the radial direction (R) so as to restrict movement of the rotor support member (60) to the second axial side (L2) relative to the case (4). The first bearing (B1) is preferably disposed on the first axial side (L1) relative to the friction engagement device (1). The third bearing (B3) is preferably disposed on the second axial side (L2) relative to the friction engagement device (1). The first bearing (B1) and the third bearing (B3) are preferably bearings equal in diameter.

This structure enables the rotor support member (60) to be suitably supported on both sides in the axial direction (L) by the first bearing (B1) and the third bearing (B3). Because the first bearing (B1) and the third bearing (B3) are bearings equal in diameter, bearings of the same type are usable as the first bearing (B1) and the third bearing (B3). This makes it possible to reduce the number of types of components, resulting in a cost reduction. When the oil passage (91, 92) through which oil is supplied to the friction engagement device (1) is defined in a portion of the connecting shaft (30) disposed inward of the tubular portion (71), a member to define such an oil passage does not have to be disposed between the connecting shaft (30) and the rotor support member (60) in the radial direction (R) as mentioned above. Thus, limitations on the location of the first bearing (B1), which is disposed to restrict movement of the rotor support member (60) to the first axial side (L1) relative to the case (4), in the radial direction (R), e.g., limitations on how small the diameter of the first bearing (B1) should be, are less restrictive than when a member to define such an oil passage is disposed. Consequently, a bearing equal in diameter to the third bearing (B3) is easily used as the first bearing (B1).

The vehicle drive apparatus (100) having any of the above structures preferably further includes an input member (20) drivingly connected to an internal combustion engine (E). The input member (20) is preferably disposed on the second axial side (L2) relative to the connecting shaft (30) so as to be coaxial with the connecting shaft (30). A first end (21) is preferably disposed such that the first end (21) is located inward or outward of a second end (31) in the radial direction (R) and overlaps with the second end (31) in a radial view along the radial direction (R), the first end (21) being an end of the input member (20) on the first axial side (L1), the second end (31) being an end of the connecting shaft (30) on the second axial side (L2). Bearings (B4, B5, B6) each capable of receiving a load exerted in the radial direction (R) are preferably disposed such that one of the bearings (B4, B5, B6) is located between the case (4) and an outer peripheral surface of the connecting shaft (30) in the radial direction (R), another one of the bearings (B4, B5, B6) is located between the case (4) and an outer peripheral surface of the input member (20) in the radial direction (R), and still another one of the bearings (B4, B5, B6) is located between the first end (21) and the second end (31) in the radial direction (R).

This structure involves using a structure for supporting the input member (20) in the radial direction (R) relative to the case (4) so as to enable the connecting shaft (30) to be directly supported in the radial direction (R) relative to the case (4) at a single location. Thus, the length of a portion of the case (4) disposed to face the outer peripheral surface of the connecting shaft (30), which is measured in the axial direction (L), is shorter than when the connecting shaft (30) is directly supported in the radial direction (R) relative to the case (4) at two locations. This consequently provides a structure that allows the rotor support member (60) to include the tubular portion (71) fitted to the outer peripheral surface of the connecting shaft (30), while limiting or preventing an increase in the size of an entirety of the apparatus in the axial direction (L).

The vehicle drive apparatus (100) preferably further includes: an input member (20) disposed on the second axial side (L2) relative to the connecting shaft (30) so as to be coaxial with the connecting shaft (30) and drivingly connected to an internal combustion engine (E); and a third bearing (B3) disposed between the rotor support member (60) and the case (4) in the radial direction (R) so as to restrict movement of the rotor support member (60) to the second axial side (L2) relative to the case (4). Bearings (B7, B8) each capable of receiving a load exerted in the axial direction (L) are preferably disposed such that one of the bearings (B7, B8) is located between the connecting shaft (30) and the input member (20) in the axial direction (L) and the other one of the bearings (B7, B8) is located between the input member (20) and the rotor support member (60) in the axial direction (L). A clearance is preferably created between the connecting shaft (30) and the input member (20) in the axial direction (L), with the connecting shaft (30) moved farthest to the second axial side (L2) relative to the case (4) and the input member (20) moved farthest to the second axial side (L2) relative to the case (4).

In this structure, a load exerted on the input member (20) to the first axial side (L1) is receivable by the case (4)

through the bearing (B7) disposed between the connecting shaft (30) and the input member (20) in the axial direction (L), the connecting shaft (30), the rotor support member (60), and the first bearing (B1). A load exerted on the input member (20) to the second axial side (L2) is receivable by the case (4) through the bearing (B8) disposed between the input member (20) and the rotor support member (60) in the axial direction (L), the rotor support member (60), and the third bearing (B3). Consequently, this structure is able to suitably restrict movement of the input member (20) to both sides in the axial direction (L).

In the above structure, a clearance is created between the connecting shaft (30) and the input member (20) in the axial direction (L), with the connecting shaft (30) moved farthest to the second axial side (L2) and the input member (20) moved farthest to the second axial side (L2). Thus, the above structure is able to prevent a relatively large load, which is exerted on the connecting shaft (30) to the second axial side (L2) owing to ballooning of the fluid transmission device (TC), from being transmitted to the third bearing (B3) through the input member (20). This makes it possible to prevent or limit an increase in the size of the third bearing (B3).

The vehicle drive apparatus (100) having the above structure preferably further includes a friction engagement device (1) to connect and disconnect the input member (20) to and from the rotary electric machine (MG). The rotor support member (60) preferably includes: a first support (61) whose movement to the first axial side (L1) relative to the case (4) is restricted by the first bearing (B1); and a second support (62) whose movement to the second axial side (L2) relative to the case (4) is restricted by the third bearing (B3), the second support (62) being disposed on the second axial side (L2) relative to the first support (61). The friction engagement device (1) is preferably disposed between the first support (61) and the second support (62) in the axial direction (L). The input member (20) preferably includes a radial extension (22) disposed to extend between the first support (61) and the second support (62) in the radial direction (R) and connected to a friction plate support (12) of the friction engagement device (1). The bearing (B8) disposed between the input member (20) and the rotor support member (60) in the axial direction (L) is preferably located between the radial extension (22) and the second support (62) in the axial direction (L).

When the vehicle drive apparatus (100) includes the friction engagement device (1) located between the first support (61) and the second support (62) in the axial direction (L) so as to connect and disconnect the input member (20) to and from the rotary electric machine (MG), this structure is able to suitably restrict movement of the input member (20) to both sides in the axial direction (L).

The vehicle drive apparatus according to the present disclosure preferably achieves at least one of the effects described above.

DESCRIPTION OF THE REFERENCE NUMERALS 1 first engagement device (friction engagement device)
3 retained member
4 case
12 second support member (friction plate support)
20 input member
21 first end
22 first flange (radial extension)
30 connecting shaft
31 second end
33 protrusion
41b fifth support surface (second peripheral surface)
60 rotor support member
61 first support
62 second support
71 first tubular portion (tubular portion)
72a first support surface (step surface)
72b second support surface (first peripheral surface)
73 step portion
91 first oil passage (oil passage through which oil is supplied to friction engagement device)
92 second oil passage (oil passage through which oil is supplied to friction engagement device)
100 vehicle drive apparatus
B1 first bearing
B2 second bearing
B3 third bearing
B4 fourth bearing (bearing capable of receiving load exerted in radial direction)
B5 fifth bearing (bearing capable of receiving load exerted in radial direction)
B6 sixth bearing (bearing capable of receiving load exerted in radial direction)
B7 seventh bearing (bearing capable of receiving load exerted in axial direction)
B8 eighth bearing (bearing capable of receiving load exerted in axial direction)
E internal combustion engine
L axial direction
L1 first axial side
L2 second axial side
MG rotary electric machine
R radial direction
Ro rotor
TC torque converter (fluid transmission device)
W wheel

The invention claimed is:

1. A vehicle drive apparatus comprising:
a rotary electric machine serving as a driving force source for a wheel;
a rotor support member supporting a rotor of the rotary electric machine;
a connecting shaft connected to the rotor support member;
a fluid transmission device connected to the rotor support member through the connecting shaft; and
a case housing the rotary electric machine, the rotor support member, the connecting shaft, and the fluid transmission device, wherein
one side in an axial direction is a first axial side, and the other side opposite to the first axial side in the axial direction is a second axial side,
the vehicle drive apparatus further comprises
a first bearing disposed between the rotor support member and the case in a radial direction so as to restrict movement of the rotor support member to the first axial side relative to the case, and
a second bearing disposed between the connecting shaft and the case in the axial direction so as to restrict movement of the connecting shaft to the second axial side relative to the case,
the fluid transmission device is disposed on the first axial side relative to the connecting shaft,
the rotor support member includes a tubular portion having a tubular shape extending in the axial direction and fitted to an outer peripheral surface of the connecting shaft, the connecting shaft includes a protrusion protruding to the second axial side relative to the tubular portion, and a retained member that is separate from the rotor support member and the connecting shaft and that is retained at a location on an outer peripheral surface of the protrusion adjacent to the tubular portion on the second axial side in order to restrict movement of the connecting shaft to the first axial side relative to the tubular portion.

2. The vehicle drive apparatus according to claim 1, further comprising a third bearing disposed between the rotor support member and the case in the radial direction so as to restrict movement of the rotor support member to the second axial side relative to the case, wherein a clearance is created between the tubular portion and the retained member in the axial direction, with the rotor support member moved farthest to the second axial side relative to the case and the connecting shaft moved farthest to the second axial side relative to the case.

3. The vehicle drive apparatus according to claim 2, wherein the first bearing is disposed between a first peripheral surface and a second peripheral surface in the radial direction, the first peripheral surface being a peripheral surface of the rotor support member, the second peripheral surface being a peripheral surface of the case, the first bearing is fitted to the first peripheral surface by loose fitting and fitted to the second peripheral surface by tight fitting, and a step portion including a step surface facing the first axial side is defined at a location on the first peripheral surface adjacent to the first bearing on the second axial side.

4. The vehicle drive apparatus according to claim 3, further comprising:

an input member drivingly connected to an internal combustion engine; and a friction engagement device to connect and disconnect the input member to and from the rotary electric machine, wherein the friction engagement device is disposed at a location inward of the rotor in the radial direction and overlapping with the rotor in a radial view along the radial direction, and an oil passage through which oil is supplied to the friction engagement device is defined in a portion of the connecting shaft disposed inward of the tubular portion.

5. The vehicle drive apparatus according to claim 4, further comprising a third bearing disposed between the rotor support member and the case in the radial direction so as to restrict movement of the rotor support member to the second axial side relative to the case, wherein the first bearing is disposed on the first axial side relative to the friction engagement device, the third bearing is disposed on the second axial side relative to the friction engagement device, and the first bearing and the third bearing are bearings equal in diameter.

6. The vehicle drive apparatus according to claim 5, further comprising an input member drivingly connected to an internal combustion engine, wherein the input member is disposed on the second axial side relative to the connecting shaft so as to be coaxial with the connecting shaft, a first end is disposed such that the first end is located inward or outward of a second end in the radial direction and overlaps with the second end in a radial view along the radial direction, the first end being an end of the input member on the first axial side, the second end being an end of the connecting shaft on the second axial side, and bearings each capable of receiving a load exerted in the radial direction are disposed such that one of the bearings is located between the case and an outer peripheral surface of the connecting shaft in the radial direction, another one of the bearings is located between the case and an outer peripheral surface of the input member in the radial direction, and still another one of the bearings is located between the first end and the second end in the radial direction.

7. The vehicle drive apparatus according to claim 6, further comprising:

an input member disposed on the second axial side relative to the connecting shaft so as to be coaxial with the connecting shaft and drivingly connected to an internal combustion engine; and a third bearing disposed between the rotor support member and the case in the radial direction so as to restrict movement of the rotor support member to the second axial side relative to the case, wherein bearings each capable of receiving a load exerted in the axial direction are disposed such that one of the bearings is located between the connecting shaft and the input member in the axial direction and the other one of the bearings is located between the input member and the rotor support member in the axial direction, and a clearance is created between the connecting shaft and the input member in the axial direction, with the connecting shaft moved farthest to the second axial side relative to the case and the input member moved farthest to the second axial side relative to the case.

8. The vehicle drive apparatus according to claim 7, further comprising a friction engagement device to connect and disconnect the input member to and from the rotary electric machine, wherein the rotor support member includes a first support whose movement to the first axial side relative to the case is restricted by the first bearing, and a second support whose movement to the second axial side relative to the case is restricted by the third bearing, the second support being disposed on the second axial side relative to the first support, the friction engagement device is disposed between the first support and the second support in the axial direction, the input member includes a radial extension disposed to extend between the first support and the second support in the radial direction and connected to a friction plate support of the friction engagement device, and the bearing disposed between the input member and the rotor support member in the axial direction is located between the radial extension and the second support in the axial direction.

9. The vehicle drive apparatus according to claim 1, wherein the first bearing is disposed between a first peripheral surface and a second peripheral surface in the radial direction, the first peripheral surface being a peripheral surface of the rotor support member, the second peripheral surface being a peripheral surface of the case, the first bearing is fitted to the first peripheral surface by loose fitting and fitted to the second peripheral surface by tight fitting, and a step portion including a step surface facing the first axial side is defined at a location on the first peripheral surface adjacent to the first bearing on the second axial side.

10. The vehicle drive apparatus according to claim 9, further comprising:

an input member drivingly connected to an internal combustion engine; and a friction engagement device to connect and disconnect the input member to and from the rotary electric machine, wherein the friction engagement device is disposed at a location inward of the rotor in the radial direction and overlapping with the rotor in a radial view along the radial direction, and an oil passage through which oil is supplied to the friction engagement device is defined in a portion of the connecting shaft disposed inward of the tubular portion.

11. The vehicle drive apparatus according to claim 10, further comprising a third bearing disposed between the rotor support member and the case in the radial direction so as to restrict movement of the rotor support member to the second axial side relative to the case, wherein the first bearing is disposed on the first axial side relative to the friction engagement device, the third bearing is disposed on the second axial side relative to the friction engagement device, and the first bearing and the third bearing are bearings equal in diameter.

12. The vehicle drive apparatus according to claim 11, further comprising an input member drivingly connected to an internal combustion engine, wherein the input member is disposed on the second axial side relative to the connecting shaft so as to be coaxial with the connecting shaft, a first end is disposed such that the first end is located inward or outward of a second end in the radial direction and overlaps with the second end in a radial view along the radial direction, the first end being an end of the input member on the first axial side, the second end being an end of the connecting shaft on the second axial side, and bearings each capable of receiving a load exerted in the radial direction are disposed such that one of the bearings is located between the case and an outer peripheral surface of the connecting shaft in the radial direction, another one of the bearings is located between the case and an outer peripheral surface of the input member in the radial direction, and still another one of the bearings is located between the first end and the second end in the radial direction.

13. The vehicle drive apparatus according to claim 12, further comprising:

an input member disposed on the second axial side relative to the connecting shaft so as to be coaxial with the connecting shaft and drivingly connected to an internal combustion engine; and a third bearing disposed between the rotor support member and the case in the radial direction so as to restrict movement of the rotor support member to the second axial side relative to the case, wherein bearings each capable of receiving a load exerted in the axial direction are disposed such that one of the bearings is located between the connecting shaft and the input member in the axial direction and the other one of the bearings is located between the input member and the rotor support member in the axial direction, and a clearance is created between the connecting shaft and the input member in the axial direction, with the connecting shaft moved farthest to the second axial side relative to the case and the input member moved farthest to the second axial side relative to the case.

14. The vehicle drive apparatus according to claim 13, further comprising a friction engagement device to connect and disconnect the input member to and from the rotary electric machine, wherein the rotor support member includes a first support whose movement to the first axial side relative to the case is restricted by the first bearing, and a second support whose movement to the second axial side relative to the case is restricted by the third bearing, the second support being disposed on the second axial side relative to the first support, the friction engagement device is disposed between the first support and the second support in the axial direction, the input member includes a radial extension disposed to extend between the first support and the second support in the radial direction and connected to a friction plate support of the friction engagement device, and the bearing disposed between the input member and the rotor support member in the axial direction is located between the radial extension and the second support in the axial direction.

\* \* \* \* \*